(12) United States Patent
Lee et al.

(10) Patent No.: US 10,343,105 B2
(45) Date of Patent: Jul. 9, 2019

(54) AIR CLEANING SYSTEM

(71) Applicant: ECOPRO CO., LTD., Chungcheongbuk-do (KR)

(72) Inventors: Dong Che Lee, Chungcheongbuk-do (KR); Seong Jin Yoon, Seoul (KR); Sung Jong Cho, Chungcheongbuk-do (KR); Jeong Yeon Kim, Chungcheongnam-do (KR); Sang Jun Park, Chungcheongbuk-do (KR); Tae Kyung Huh, Seoul (KR)

(73) Assignee: ECOPRO CO., LTD. (KR)

( * ) Notice: Subject to any disclaimer, the term of this patent is extended or adjusted under 35 U.S.C. 154(b) by 190 days.

(21) Appl. No.: 15/540,835

(22) PCT Filed: Jan. 15, 2015

(86) PCT No.: PCT/KR2015/000442
§ 371 (c)(1),
(2) Date: Jun. 29, 2017

(87) PCT Pub. No.: WO2016/108322
PCT Pub. Date: Jul. 7, 2016

(65) Prior Publication Data
US 2018/0001250 A1    Jan. 4, 2018

(30) Foreign Application Priority Data

Dec. 31, 2014  (KR) .......................... 10-2014-0194645

(51) Int. Cl.
*B01D 53/04*  (2006.01)
*B01D 53/26*  (2006.01)

(52) U.S. Cl.
CPC ..... *B01D 53/0438* (2013.01); *B01D 53/0462* (2013.01); *B01D 53/261* (2013.01);
(Continued)

(58) Field of Classification Search
CPC ............ B01D 53/0438; B01D 53/0462; B01D 53/261; B01D 2253/104; B01D 2253/108;
(Continued)

(56) References Cited

U.S. PATENT DOCUMENTS 4,312,641 A * 1/1982 Verrando ............... B01D 53/04
95/105
4,322,223 A * 3/1982 Christel, Jr. ....... B01D 53/0454
95/105

(Continued)

FOREIGN PATENT DOCUMENTS

| KR | 101414039 B1 | 6/2014 |
| KR | 1020140124097 A | 10/2014 |
| KR | 1020140132940 A | 11/2014 |

OTHER PUBLICATIONS

International Search Report and Written Opinion; dated Jul. 9, 2015 for PCT Application No. PCT/KR2015/000442.

*Primary Examiner* — Frank M Lawrence, Jr.
(74) *Attorney, Agent, or Firm* — Mendelsohn Dunleavy, P.C.

(57) ABSTRACT

Provided an air cleaning system, which includes: a first reactor which has a first inlet and a first outlet and in which a channel is formed; a first moisture adsorption filter and a first water-soluble gas pollutant adsorption filter that are provided inside the first reactor and are provided so that a gas passes therethrough sequentially while flowing along the channel from the first inlet to the first outlet; a plurality of first magnetrons that are provided at a lateral portion of the first reactor so as to correspond respectively to the first moisture adsorption filter and the first water-soluble gas pollutant adsorption filter and selectively apply microwaves to the first moisture adsorption filter and the first water-soluble gas pollutant adsorption filter; and a heat exchanger that receives hot air containing a water-soluble gas pollutant (Continued)

and moisture, both of which are desorbed from the first moisture adsorption filter and the first water-soluble gas pollutant adsorption filter and are discharged by the first outlet, condenses the moisture into water, and dissolves and discharges the water-soluble gas pollutant in the condensed water. According to the present invention, the air cleaning system can unify a dehumidifying process and a water-soluble gas pollutant removing process to simplify an air cleaning process, recover and recycle waste heat by introducing microwaves and the heat exchanger so as to contribute to energy saving, and be used semi-permanently without a need to periodically replace a filter.

14 Claims, 5 Drawing Sheets

(52) U.S. Cl.
CPC .. *B01D 2253/104* (2013.01); *B01D 2253/108* (2013.01); *B01D 2253/1085* (2013.01); *B01D 2257/2027* (2013.01); *B01D 2257/302* (2013.01); *B01D 2257/304* (2013.01); *B01D 2257/308* (2013.01); *B01D 2257/402* (2013.01); *B01D 2257/404* (2013.01); *B01D 2257/406* (2013.01); *B01D 2257/702* (2013.01); *B01D 2258/06* (2013.01); *B01D 2259/402* (2013.01); *B01D 2259/40094* (2013.01); *B01D 2259/4148* (2013.01); *B01D 2259/4508* (2013.01); *Y02C 20/10* (2013.01)

(58) Field of Classification Search
CPC ........ B01D 2253/1085; B01D 2258/06; B01D 2257/2027; B01D 2257/302; B01D 2257/304; B01D 2257/308; B01D 2257/402; B01D 2257/404; B01D 2257/406; B01D 2257/702; B01D 2257/2259; B01D 2257/40094; B01D 2257/4148; B01D 2257/4508
USPC ........................... 96/121, 122, 126, 132, 143
See application file for complete search history.

(56) References Cited

U.S. PATENT DOCUMENTS

| | | | | |
|---|---|---|---|---|
| 4,421,651 A | * | 12/1983 | Burkholder | B01D 53/04 210/672 |
| 5,227,598 A | * | 7/1993 | Woodmansee | B01D 53/0438 219/700 |
| 5,581,903 A | * | 12/1996 | Botich | B01D 53/261 34/264 |
| 6,226,888 B1 | * | 5/2001 | Lang | B01D 53/261 34/332 |
| 6,511,643 B1 | * | 1/2003 | Schmidt-Traub | B01D 53/02 423/245.1 |

* cited by examiner

[Fig. 1]
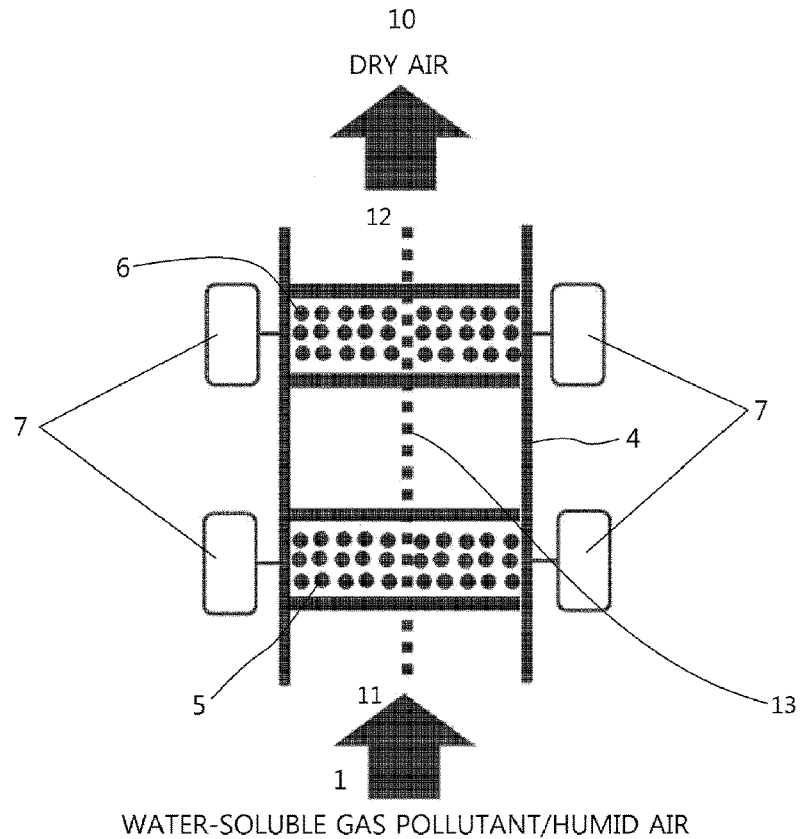
[Fig. 2]
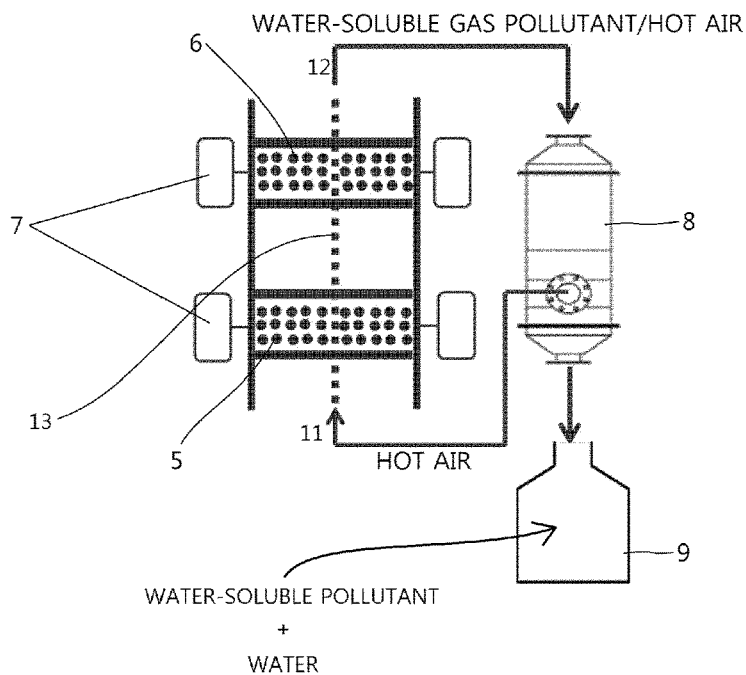

[Fig. 3]
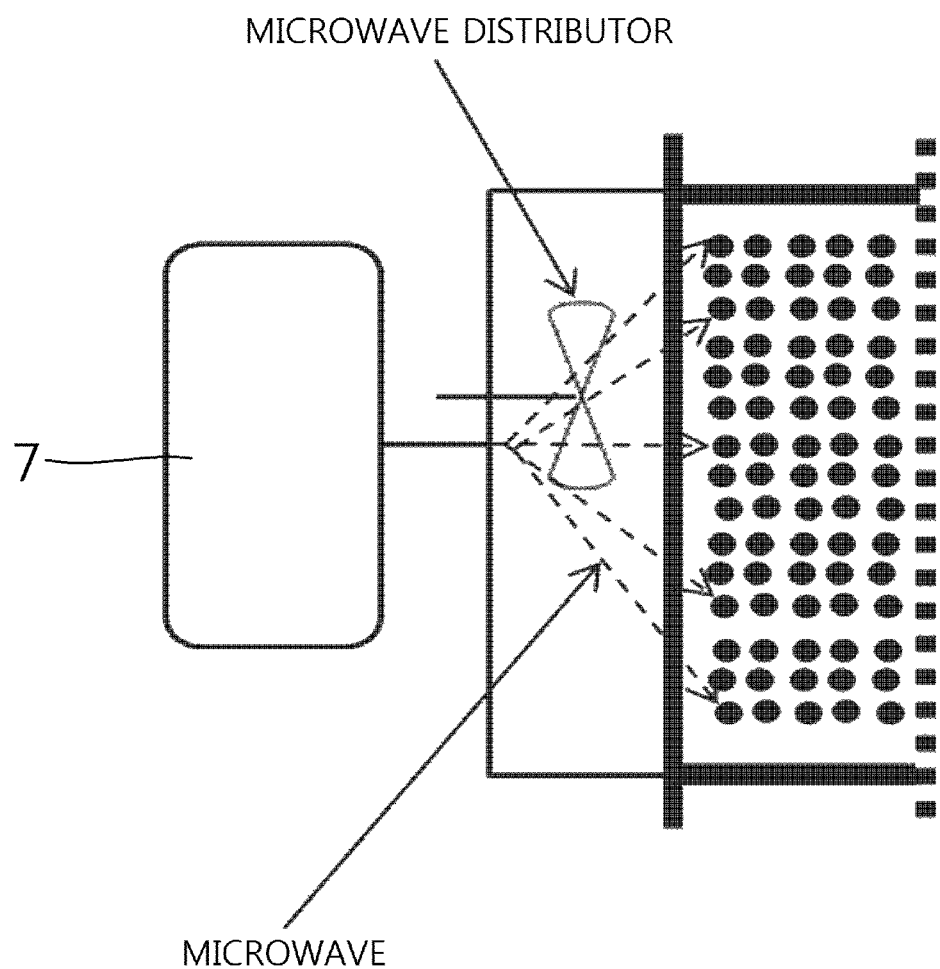

[Fig. 4]
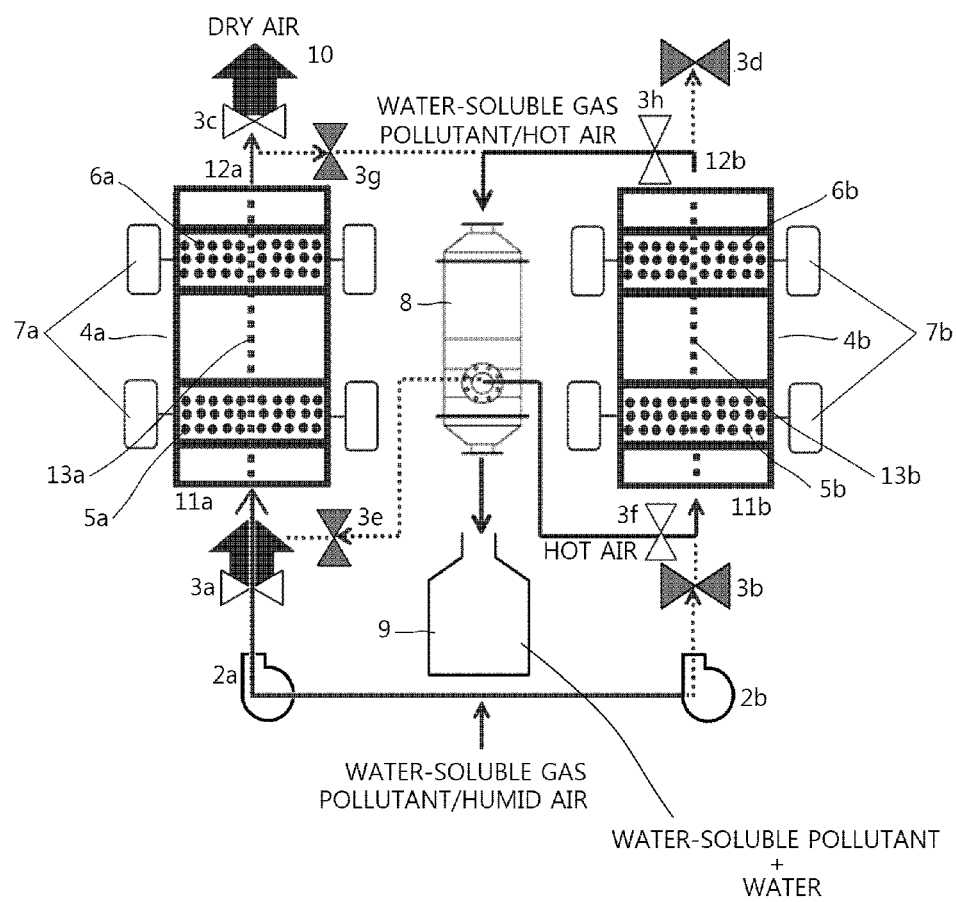

[Fig. 5]
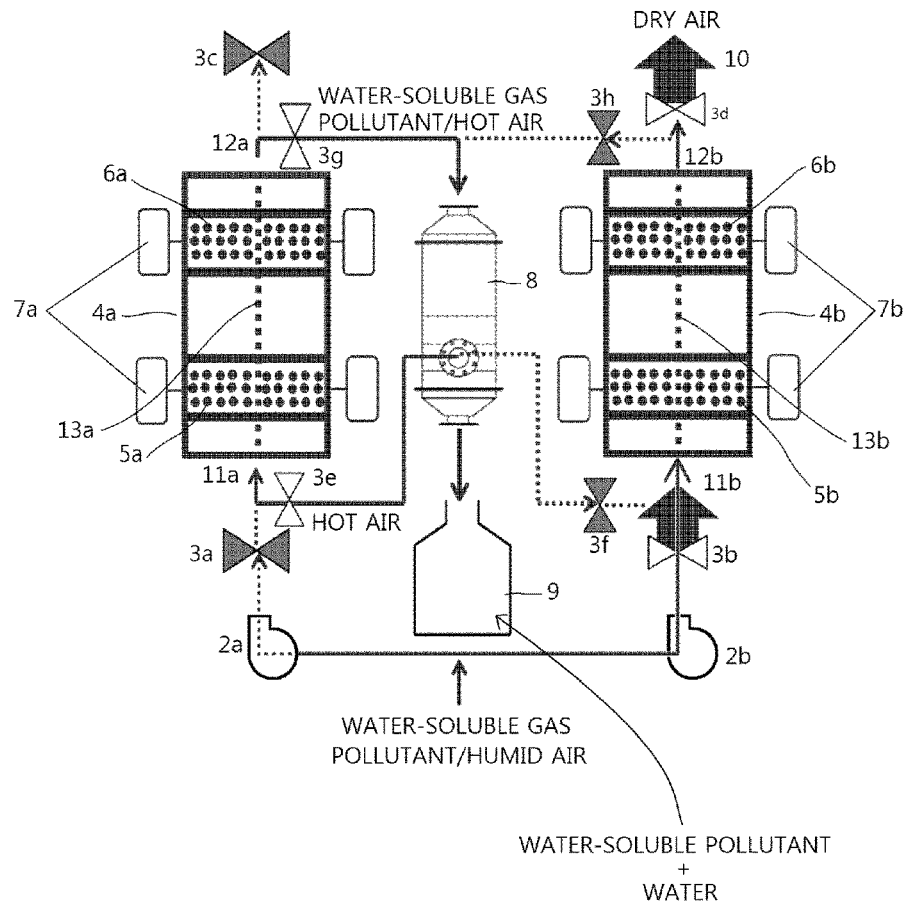
[Fig. 6]
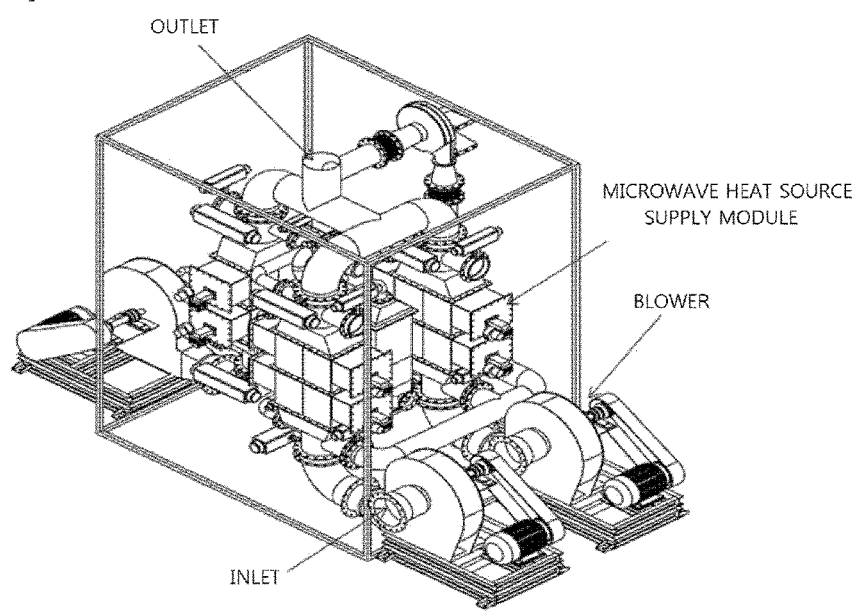

[Fig. 7]
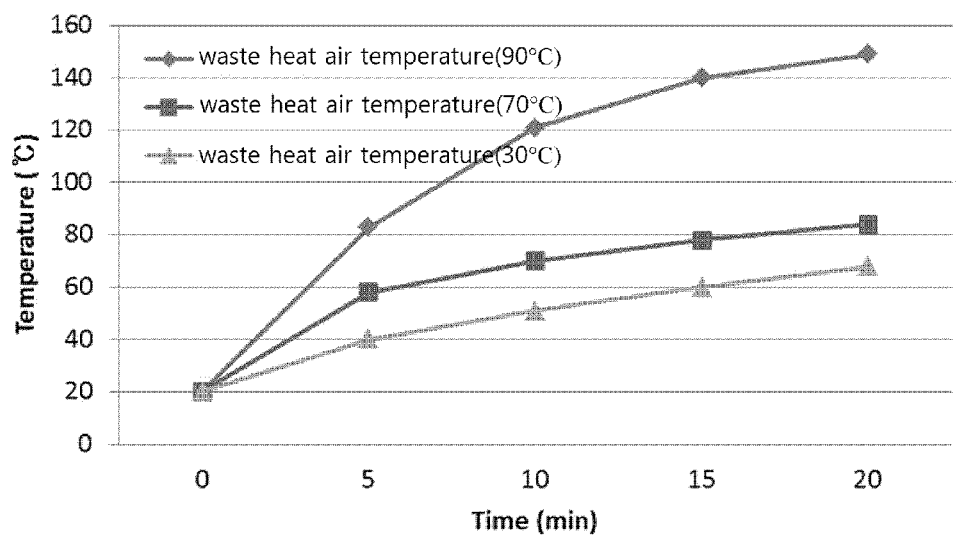

AIR CLEANING SYSTEM

TECHNICAL FIELD

The present invention relates to an air cleaning system and, more particularly, to an air cleaning system capable of simultaneously removing a water-soluble gas harmful to a human body and moisture in an energy-efficient way.

BACKGROUND ART

In general, elements such as a semiconductor or a liquid crystal display (LCD) are manufactured in a clean room with a high cleanliness level. The quality of the semi-conductor and LCD are sensitive to an influence by humidity and pollutants in terms of a manufacturing process. Thus, it is necessary to prevent an inflow of pollutants such as dust through the medium of air introduced into the clean room, and to regulate a temperature and humidity of the introduced air to optimum conditions (12° C. and 50%). Meanwhile, most (about 90%) of the energy used in a semiconductor or LCD manufacturing process is electric power, and air conditioning facilities account for 40% of the electric power. Most of the electric power consumed by the air conditioning facilities is used to operate outside air conditioning units for processing outside air introduced into the clean room. Therefore, it is possible to expect a very high energy saving effect only by reducing the electric power used in the outside air conditioning units.

Meanwhile, a dehumidifying system is currently in use in order to adjust the humidity in the semiconductor or LCD manufacturing process. Such a dehumidifying system periodically repeats adsorption/desorption of moisture ($H_2O$) using a ceramic paper adsorption rotor to maintain a constant temperature and humidity. Especially, the ceramic paper adsorption rotor is regenerated by desorbing the adsorbed $H_2O$ with a hot wind having a temperature of 150° C. or more, and thus is low in energy efficiency. As such, there is an urgent need to develop technology for providing high energy efficiency and excellent dehumidifying performance.

When a water-soluble gas, which is contained in air and is harmful to the human body, is introduced inside in the semiconductor or LCD manufacturing process, this has a strong effect on production efficiency. Currently, a chemical filter system that employs an activated carbon-based adsorbent in order to remove such a water-soluble gas harmful to the human body is used. However, there is a problem that, when the adsorbent exceeds a service capacity, the chemical filter system should be replaced. Further, if a water-soluble gas pollutant desorbed from the chemical filter system is captured, concentrated, and removed, there is a problem that a separate processing process and facility are required, and a huge facility for storing gaseous pollutants is required.

In this way, a dual system using the dehumidifying system and the chemical filter system is currently applied to the clean room, which is energy inefficient. Furthermore, there is a problem that the chemical filter system should be periodically replaced.

DISCLOSURE OF INVENTION

Technical Problem

Accordingly, an object of the present invention is to provide a semi-permanent air cleaning system that unifies a dehumidifying system and a chemical filter system, employs a low-energy consumption means, cuts down energy through recovery of waste heat, and particularly, removes a need to periodically replace the chemical filter system.

However, the problem to be solved by the present disclosure is not limited to the aforementioned problem, and other unmentioned problems can be clearly understood by those skilled in the art from the following description.

Solution to Problem

In order to achieve the above object, according to an aspect of the present invention, there is provided an air cleaning system, which includes: a first reactor which has a first inlet and a first outlet and in which a channel is formed; a first moisture adsorption filter and a first water-soluble gas pollutant adsorption filter that are provided inside the first reactor and are provided so that a gas passes therethrough sequentially while flowing along the channel from the first inlet to the first outlet; a plurality of first magnetrons that are provided at a lateral portion of the first reactor so as to correspond respectively to the first moisture adsorption filter and the first water-soluble gas pollutant adsorption filter and selectively apply microwaves to the first moisture adsorption filter and the first water-soluble gas pollutant adsorption filter; and a heat exchanger that receives hot air containing a water-soluble gas pollutant and moisture, both of which are desorbed from the first moisture adsorption filter and the first water-soluble gas pollutant adsorption filter and are discharged by the first outlet, condenses the moisture into water, and dissolves and discharges the water-soluble gas pollutant in the condensed water.

According to an embodiment, the air cleaning system may further include a second reactor provided independently of the first reactor so as to be able to alternately and repetitively perform an adsorption process and a desorption process.

According to an embodiment, the air cleaning system may further include supply pipes that are provided to communicate with the first and second inlets and have valve units selectively controlling supply of the gas flowing into the first and second reactors.

According to an embodiment, the hot air passing through the heat exchanger may be injected into the first or second reactor as a purge gas.

Advantageous Effects of Invention

According to the present invention, the air cleaning system can unify a dehumidifying process and a water-soluble gas pollutant removing process to simplify an air cleaning process, recover and recycle waste heat by introducing the microwaves and the heat exchanger so as to contribute to energy saving, and be used semi-permanently without a need to periodically replace a filter.

BRIEF DESCRIPTION OF DRAWINGS

FIG. 1 illustrates a configuration of a reactor in an air cleaning system according to an embodiment of the present invention.

FIG. 2 illustrates a configuration of a regenerative adsorption filter in the air cleaning system according to the embodiment of the present invention.

FIG. 3 illustrates a configuration of a microwave heat source supply module according to an embodiment of the present invention.

FIGS. 4 and 5 illustrate a configuration of the air cleaning system according to the embodiment of the present invention wherein the air cleaning system can provide both a water-soluble gas pollutant removing function and a dehumidifying function.

FIG. 6 illustrates an appearance of the air cleaning system according to the embodiment of the present invention.

FIG. 7 is a graph showing an increasing value of a temperature of an adsorbent according to a reaction of microwaves as a result of changing a temperature of waste heat in the air cleaning system according to the embodiment of the present invention.

MODE FOR THE INVENTION

Hereinafter, the present invention will be described in detail based on embodiments. However, the embodiments are merely examples for describing the prevent invention in greater detail, and do not restrict the claimed scope of the present invention.

Hereinafter, exemplary embodiments of the present invention will be described in detail with reference to the accompanying drawings so as to be able to be carried out by those skilled in the art. However, the present invention may be variously implemented and is not limited to the embodiments described herein. In the drawings, in order to clearly describe the present invention, portions which are not related to the description of the present invention will be omitted, and similar portions are denoted by similar reference numerals throughout the specification.

It will be understood that, throughout the specification, when an element is referred to as being "connected" or "coupled" to another element, it can be directly connected or coupled to the other element, or it can be indirectly connected or coupled to the other element via an intervening element.

It will be understood that, throughout the specification, when an element is referred to as being "on" another element, it can be directly on the other element or be indirectly on the other element with one or more intervening elements interposed therebetween.

When a portion "includes" a component throughout the specification, it means that other components are not excluded but can be further included unless otherwise defined. The terms "approximately" and/or "substantially", as used in the entire specification to designate degree, are used to mean a number value or approximations of the number value when the manufacturing techniques and allowable errors of materials that are inherent to the corresponding meanings are presented, and are used to prevent any unscrupulous infringer from unfairly using the disclosed contents in which accurate or absolute number values are given to assist understanding of the present invention.

It will be understood that, throughout the specification, the term "combination thereof" included in the Markush type expression refers to a mixture or combination of one or more selected from the group consisting of constituent elements described in the Markush type expression, and refers to one or more selected from the group consisting of the aforementioned constituent elements.

As used herein, the term "comprises", "comprising", "includes", "including", "have", "having", or any other variation thereof, shall be construed as including all of numerous components or steps described herein, but some of the numerous components or steps or additional components or steps.

It will be understood that, although the terms including the ordinal numbers such as first or second may be used herein to describe various elements, these elements should not be limited by these terms. These terms are only used to distinguish one element from another element. For example, a first element could be termed second element, and a second element could be termed first element without departing from the teachings of the present invention.

The present invention is directed to an air cleaning system capable of having application to semiconductor manufacturing processes or liquid crystal display (LCD) manufacturing processes, and particularly, is intended to clean air containing moisture and a water-soluble gas pollutant simultaneously.

The water-soluble gas pollutant may include, but is not limited to, one selected from the group consisting of nitrogen oxide (NO), nitrogen dioxide ($NO_2$), sulfur dioxide ($SO_2$), sulfur trioxide ($SO_3$), hydrogen sulfide ($H_2S$), carbonyl sulfide (COS), carbon disulfide ($CS_2$), ammonia ($NH_3$), isopropyl alcohol (IPA; $C_3H_8O$), methyl ethyl ketone (MEK; $C_4H_8O$), a fluoride, and a mixture thereof. Preferably, a target of the water-soluble gas pollutant is NO, $NO_2$, $SO_2$, IPA, or MEK, which has an effect on a semi-conductor or LCD manufacturing process.

To this end, the present invention is intended to propose an air cleaning system that is configured to adsorb the moisture and the water-soluble gas pollutant in a reactor in which a moisture adsorption filter and a water-soluble gas pollutant adsorption filter are sequentially provided, apply microwaves to desorb the adsorbed materials, and cause the desorbed materials to pass through a heat exchanger so as to condense water and simultaneously dissolve a water-soluble pollutant in the condensed water to discharge the dissolved material.

As illustrated in the accompanying figures, the air cleaning system of the present invention includes a reactor in which an adsorption filter containing an adsorbent is disposed, a microwave heat source supply module, and a heat exchanger.

To be specific, the present invention proposes an air cleaning system, which includes: a first reactor 4a which has a first inlet 11a and a first outlet 12a and in which a channel is formed; a first moisture adsorption filter 5a and a first water-soluble gas pollutant adsorption filter 6a that are provided inside the first reactor 4a and are provided so that a gas passes therethrough sequentially while flowing along the channel from the first inlet 11a to the first outlet 12a; a plurality of first magnetrons 7a that are provided at a lateral portion of the first reactor 4a so as to correspond respectively to the first moisture adsorption filter 5a and the first water-soluble gas pollutant adsorption filter 6a and selectively apply microwaves to the first moisture adsorption filter 5a and the first water-soluble gas pollutant adsorption filter 6a; and a heat exchanger 8 that receives hot air containing a water-soluble gas pollutant and moisture, both of which are desorbed from the first moisture adsorption filter 5a and the first water-soluble gas pollutant adsorption filter 6a and are discharged by the first outlet 12a, condenses the moisture into water, and dissolves and discharges the water-soluble gas pollutant in the condensed water.

FIG. 1 schematically illustrates a configuration of the reactor of the present invention. The reactor 4 may be provided in the shape of a cylinder that has an inlet 11, an outlet 12, and a channel communicating with the inlet 11 and the outlet 12. A cross section of the cylinder may have any shape such as a circular shape, or a polygonal shape including a tetragonal shape. A moisture adsorption filter 5 and a water-soluble gas pollutant adsorption filter 6 are sequentially disposed in the reactor 4 from the inlet 11 to the outlet 12.

The moisture adsorption filter is disposed upstream of the channel along which the gas to be processed flows and selectively adsorbs the moisture first, and the water-soluble gas pollutant adsorption filter is disposed further downstream and selectively adsorbs the polluting gas. The present invention is not limited thereto. With this configuration, it is expected that the moisture and the gas pollutant can be efficiently adsorbed.

When humid air 1 containing the water-soluble gas pollutant and the moisture is introduced through the inlet 11 of the reactor, the humid air 1 flows along the channel in the reactor. Here, the moisture and the water-soluble pollutant are adsorbed while the humid air 1 sequentially flows through the adsorption filters. As a result, cleaned dry air 10 is discharged through the outlet 12.

To desorb the moisture and the water-soluble pollutant adsorbed on the adsorption filters to regenerate the adsorption filters, a large quantity of hot air is used. As such, a constant heat source supply is necessarily required. Typically, an electric heater etc. has been used. However, in the present invention, microwaves are used as the heat source so as to contribute to energy saving.

In detail, a lateral portion of the reactor 4 is provided with at least two magnetrons 7 so as to correspond respectively to the moisture adsorption filter 5 and the water-soluble gas pollutant adsorption filter 6, and the microwaves are selectively applied to the moisture adsorption filter 5 and the water-soluble gas pollutant adsorption filter 6 by the magnetrons 7, and heat the adsorption filter(s). Thereby, the materials adsorbed to the adsorption filters are desorbed to regenerate the adsorption filters. At least one magnetron 7 may be provided for each adsorption filter, and thus the microwaves may be applied in one direction, in two directions, or more than two directions.

If necessary, the air cleaning system may further include a blocking plate 13 that is disposed inside the reactor 4 and prevents a disturbance in the microwaves. For example, when the microwaves are applied in the two or more directions, the blocking plate 13 is installed in the middle of the reactor so as to be perpendicular to traveling directions of the microwaves. Thereby, the blocking plate 13 can prevent the disturbance in the microwaves applied in the two or more directions. In addition, an absorption plate capable of absorbing the microwaves that were not absorbed to the adsorption filters and passed through the adsorption filters may be additionally installed on an upper, lower, or lateral portion of the reactor.

FIG. 3 illustrates an example of a microwave heat source supply module. A microwave distributor is disposed on a microwave path generated from the magnetron 7 so as to be able to be secure more uniform irradiation.

The hot air containing the water-soluble gas pollutant and the moisture, both of which are desorbed from the moisture adsorption filter 5 and the water-soluble gas pollutant adsorption filter 6 and are discharged by the outlet, is supplied to the heat exchanger 8 provided separately as illustrated in FIG. 2. The moisture is condensed into water while passing through the heat exchanger 8, and the water-soluble pollutant is discharged with the water-soluble gas pollutant dissolved in the condensed water. In this way, the dehumidifying process and the polluting gas removing process are unified. Thereby, it is expected that the prior art problems with the moisture adsorption removing process and the water-soluble gas pollutant adsorption removing process can be addressed, which contributes to process simplification and energy saving.

Further, heat (about 150° C.) generated during the desorption is received by the heat exchanger in the form of hot air, and the moisture emits waste heat while being condensed in the heat exchanger 8. The emitted waste heat is recovered to heat the air, and the heated air may be injected to the reactor as a purge gas for regenerating the adsorption filters. The purge gas may be used as a carrier gas transferring the waste heat. As shown in FIG. 7, as a temperature of the waste heat increases, a temperature of the adsorbent increases. As a result, reactivity caused by the microwaves is apt to increase, and thus a regenerating time of the adsorption filter is expected to be reduced. The waste heat recovery and the regenerating should still contribute more to the energy saving. The air cleaning system may further include a second reactor 4b having the same structure as the first reactor 4a (see FIGS. 4 and 5).

The air cleaning system may further include: a second reactor 4b which has a second inlet 11b and a second outlet 12b and in which a channel is formed; a second moisture adsorption filter 5b and a second water-soluble gas pollutant adsorption filter 6b that are installed inside the second reactor 4b and are provided so that a gas passes therethrough sequentially while flowing along the channel from the second inlet 11b to the second outlet 12b; and a plurality of second magnetrons 7b that are provided at a lateral portion of the second reactor 4b so as to correspond respectively to the second moisture adsorption filter 5b and the second water-soluble gas pollutant adsorption filter 6b and selectively apply microwaves to the second moisture adsorption filter 5b and the second water-soluble gas pollutant adsorption filter 6b. The heat exchanger 8 receives the hot air containing the water-soluble gas pollutant and the moisture, both of which are desorbed from the second moisture adsorption filter 5b and the second water-soluble gas pollutant adsorption filter 6b and are discharged by the second outlet 12b, condenses the moisture into water, and dissolves and discharges the water-soluble gas pollutant in the condensed water.

In detail, the present invention provides a dual column system in which the two reactors, each of which is equipped with the adsorption filters, are connected in parallel so as to be able to alternately perform the adsorption process and the desorption process. In the present invention, the gas to be processed is the humid air containing the water-soluble gas pollutant and the moisture. The gas to be processed is controlled to be supplied to the reactor in which the adsorption process is under way, and not to be supplied to the reactor in which the desorption process is under way. The supply of the gas flowing into the reactors can be selectively controlled through supply pipes having respectively valve units 3a and 3b. The supply pipes may be provided to communicate with the first and second inlets 11a and 11b. Further, the gas to be processed may be supplied into the reactors through pumps 2a and 2b.

Referring to FIG. 4, the adsorption process is performed in the first reactor 4a. The adsorption process may be performed as follows.

Humid air containing a water-soluble gas pollutant and moisture is introduced into the first reactor 4a by opening an opening/closing valve 3a located at the first inlet 11a of the first reactor 4a which has the first inlet 11a and the first outlet 12a and in which the first moisture adsorption filter 5a and the first water-soluble gas pollutant adsorption filter 6a are sequentially installed. The moisture and the water-soluble pollutant are adsorbed to the adsorption filters 5a and 6a while the introduced materials flows through the first moisture adsorption filter 5a and the first water-soluble gas pollutant adsorption filter 6a, and cleaned dry air 10 is discharged in a state in which an opening/closing valve 3c located at the first outlet 12a is opened. The cleaned dry air 10 is controlled using an opening/closing valve 3g so as to prevent introduction into the heat exchanger 8. Further, hot air generated from the heat exchanger 8 in the adsorption process is controlled using an opening/closing valve 3e so as to prevent introduction into the first reactor 4a.

Referring to FIG. 4, the desorption process is performed in the second reactor 4b. The desorption process may be performed as follows.

The moisture and the water-soluble pollutant have been respectively adsorbed to the second moisture adsorption filter 5b and the second water-soluble gas pollutant adsorption filter 6b that are sequentially disposed inside the second reactor 4b having the second inlet 11b and the second outlet 12b. Microwaves are applied to the adsorption filters 5b and 6b so as to increase a temperature by the second magnetrons 7b, and the adsorbed moisture and water-soluble pollutant are desorbed. The desorbed moisture and pollutant are discharged from the second outlet 12b in the form of hot air or gas, and are supplied to the heat exchanger 8. The moisture is condensed into water in the heat exchanger 8, and the water-soluble gas pollutant is dissolved in the water and is stored in a separate storage container 9. The desorbed moisture and pollutant are controlled using opening/closing valves 3h and 3d so as to flow only into the heat exchanger 8 without being discharged to the outside. Further, the hot air generated from the heat exchanger 8 in the desorption process is controlled to flow into the second reactor 4b using an opening/closing valve 3f so as to be used as a purge gas. External humid air containing a water-soluble gas pollutant and moisture is controlled to prevent introduction into the second reactor 4b using the opening/closing valve 3b.

In this way, the adsorption process and the desorption process are alternately performed in the two reactors without replacing the adsorption filters. FIG. 5 illustrates a configuration of the air cleaning system in which the desorption process is performed in the first reactor 4a and the adsorption process is performed in the second reactor 4b. Here, the desorption and adsorption processes are performed in the same way as described above. FIG. 6 illustrates an appearance of the dual column system as an example.

The moisture adsorption filter may include an adsorbent that selectively adsorbs the moisture. For example, the adsorbent may include, but is not limited to, one selected from the group consisting of hydrophilic zeolite, silica gel, activated alumina, impregnated alumina, calcium chloride, and a mixture thereof.

Generally, zeolite has a structure in which silicon and aluminum atoms are three-dimensionally connected via oxygen atoms, and may include an alkaline metal such as sodium, potassium, lithium, or the like. A variety of zeolites can be produced according to a molar ratio of silicon and aluminum (Si/Al ratio) and a three-dimensional structure. The zeolite of the present invention may include at least one selected from the group consisting of zeolite A, zeolite X, zeolite Y, zeolite L, ZSM-5 having a pentasil structure, mordenite, and b-zeolite.

When the zeolite is used as the adsorbent of the moisture adsorption filter, a hydrophilic zeolite having a Si/Al ratio of 10 or less is preferably used, but the present invention is not limited thereto.

The water-soluble gas pollutant adsorption filter may include an adsorbent that selectively adsorbs the gas pollutant. For example, the adsorbent may include, but is not limited to, one selected from the group consisting of hydrophobic zeolite, activated alumina, and a mixture thereof.

Due to a strong electrostatic field generated by a cation exchangeable with an anion of ($AlO_2$) in a framework, zeolite can show a high affinity with water (high hydrophilicity). However, if the Si/Al ratio is increased by selection of synthesis conditions or dealumination, zeolite shows hydrophobicity, and selectively adsorbs an organic molecule rather than water. The hydrophobic zeolite can selectively adsorb an organic compound in the moisture-containing gas.

When the zeolite is used as the adsorbent of the water-soluble gas pollutant adsorption filter, hydrophobic zeolite having a Si/Al ratio from 10 to 300, and preferably, 20 to 200 is used. However, the present invention is not limited thereto. The hydrophobic zeolite may be faujasite, mordenite, or ZSM-5, and may be ion-exchanged with K, Li, Cs, or Ba.

Further, urea which is harmless to the human body is additionally used in the water-soluble gas pollutant adsorption filter, and thereby an ecofriendly adsorbent can be produced.

The moisture adsorption filter and the water-soluble gas pollutant adsorption filter additionally include a microwave absorption material such as SiC, a metal oxide, or a metal compound so as to be able to reduce the microwave energy required for the desorption.

The adsorption materials may be used in an individual form or a mixture form according to usage purpose, or may be formed and used in an arbitrary shape such as a spherical shape, a pellet shape, or a honeycomb shape. Further, a filtering medium, a binder, or a pore former may be used as needed.

The air cleaning system according to the present invention can be applied at room temperature, be expected to reduce energy by heat recovery and regenerating so there is no need for a high-temperature process, and simultaneously remove the moisture and the water-soluble gas pollutant included in air. Particularly, the air cleaning system periodically regenerates the materials using the microwaves, and thus can be used semi-permanently without replacement.

INDUSTRIAL APPLICABILITY

The microwaves used in the present invention directly heat the adsorbent, and thus can increase a temperature within a short time. Thereby, the air cleaning system is expected to increase energy efficiency by about 30% or more, compared to an existing dehumidifying system using a hot wind.

The invention claimed is:
1. An air cleaning system comprising:
a first reactor which has a first inlet and a first outlet and in which a channel is formed;
a first moisture adsorption filter and a first water-soluble gas pollutant adsorption filter that are provided inside the first reactor and are provided so that a gas passes therethrough sequentially while flowing along the channel from the first inlet to the first outlet;
a plurality of first magnetrons that are provided at a lateral portion of the first reactor so as to correspond respectively to the first moisture adsorption filter and the first water-soluble gas pollutant adsorption filter and said first magnetrons are configured to selectively apply microwaves to the first moisture adsorption filter and the first water-soluble gas pollutant adsorption filter; and a heat exchanger that is positioned to receive hot air containing a water-soluble gas pollutant and moisture, both of which are desorbed from the first moisture adsorption filter and the first water-soluble gas pollutant adsorption filter and are discharged by the first outlet, said heat exchanger being configured to condense the moisture into water, and to dissolve and discharge the water-soluble gas pollutant in the condensed water.

2. The air cleaning system according to claim 1, further comprising:
a second reactor which is provided independently of the first reactor and has a second inlet and a second outlet and in which a channel is formed;
a second moisture adsorption filter and a second water-soluble gas pollutant adsorption filter that are installed inside the second reactor and are provided so that a gas passes therethrough sequentially while flowing along the channel from the second inlet to the second outlet; and
a plurality of second magnetrons that are provided at a lateral portion of the second reactor so as to correspond respectively to the second moisture adsorption filter and the second water-soluble gas pollutant adsorption filter and said second magnetrons are configured selectively apply microwaves to the second moisture adsorption filter and the second water-soluble gas pollutant adsorption filter,
wherein the heat exchanger is positioned to receive the hot air containing the water-soluble gas pollutant and the moisture, both of which are desorbed from the second moisture adsorption filter and the second water-soluble gas pollutant adsorption filter and are discharged by the second outlet, and said heat exchanger is configured to condense the moisture into water, and dissolve and discharge the water-soluble gas pollutant in the condensed water.

3. The air cleaning system according to claim 2, further comprising supply pipes that are provided to communicate with the first and second inlets and have valve units configured to selectively control supply of the gas flowing into the first and second reactors.

4. The air cleaning system according to claim 1, wherein further configured for injection of the hot air passing through the heat exchanger into the first or second reactor as a purge gas.

5. The air cleaning system according to claim 1, wherein the water-soluble gas pollutant includes one selected from the group consisting of nitrogen oxide (NO), nitrogen dioxide ($NO_2$), sulfur dioxide ($SO_2$), sulfur trioxide ($SO_3$), hydrogen sulfide ($H_2S$), carbonyl sulfide (COS), carbon disulfide ($CS_2$), ammonia ($NH_3$), isopropyl alcohol (IPA; $C_3H_8O$), methyl ethyl ketone (MEK; $C_4H_8O$), fluoride, and a mixture thereof.

6. The air cleaning system according to claim 1, further comprising a blocking plate that is disposed inside the first reactor to prevent a disturbance in the microwaves.

7. The air cleaning system according to claim 1, wherein the first moisture adsorption filter includes one selected from the group consisting of hydrophilic zeolite, silica gel, activated alumina, impregnated alumina, calcium chloride, and a mixture thereof.

8. The air cleaning system according to claim 1, wherein the first water-soluble gas pollutant adsorption filter includes one selected from the group consisting of hydrophobic zeolite, activated alumina, and a mixture thereof.

9. The air cleaning system according to claim 1, wherein the first moisture adsorption filter and the first water-soluble gas pollutant adsorption filter further include a microwave absorption material.

10. The air cleaning system according to claim 2, further comprising a blocking plate that is disposed inside the second reactor to prevent a disturbance in the microwaves.

11. The air cleaning system according to claim 2, wherein the second moisture adsorption filter includes one selected from the group consisting of hydrophilic zeolite, silica gel, activated alumina, impregnated alumina, calcium chloride, and a mixture thereof.

12. The air cleaning system according to claim 2, wherein the second water-soluble gas pollutant adsorption filter includes one selected from the group consisting of hydrophobic zeolite, activated alumina, and a mixture thereof.

13. The air cleaning system according to claim 2, wherein the second moisture adsorption filter and the second water-soluble gas pollutant adsorption filter further include a microwave absorption material.

14. The air cleaning system according to claim 2, wherein further configured for injection of the hot air passing through the heat exchanger into the first or second reactor as a purge gas.

* * * * *